US012172133B2

(12) United States Patent
Hayashi et al.

(10) Patent No.: US 12,172,133 B2
(45) Date of Patent: Dec. 24, 2024

(54) POROUS HOLLOW FIBER MEMBRANE

(71) Applicant: TORAY INDUSTRIES, INC., Tokyo (JP)

(72) Inventors: Akihiro Hayashi, Otsu (JP); Kaori Akaike, Tokyo (JP); Suguru Ushiro, Otsu (JP); Yoshiyuki Ueno, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 787 days.

(21) Appl. No.: 17/049,806

(22) PCT Filed: May 24, 2019

(86) PCT No.: PCT/JP2019/020597
§ 371 (c)(1),
(2) Date: Oct. 22, 2020

(87) PCT Pub. No.: WO2019/225730
PCT Pub. Date: Nov. 28, 2019

(65) Prior Publication Data
US 2021/0213394 A1 Jul. 15, 2021

(30) Foreign Application Priority Data
May 24, 2018 (JP) ................. 2018-099331

(51) Int. Cl.
*B01D 69/02* (2006.01)
*B01D 63/02* (2006.01)
(Continued)

(52) U.S. Cl.
CPC .......... *B01D 69/02* (2013.01); *B01D 63/031* (2022.08); *B01D 69/08* (2013.01); *B01D 71/381* (2022.08);
(Continued)

(58) Field of Classification Search
CPC .... B01D 71/68; B01D 67/0088; B01D 69/02; B01D 69/08; B01D 71/38; B01D 71/44;
(Continued)

(56) References Cited

U.S. PATENT DOCUMENTS

| 5,340,480 A | 8/1994 | Kawata et al. |
| 2007/0082401 A1* | 4/2007 | Wada ............... B01D 69/02 436/8 |

(Continued)

FOREIGN PATENT DOCUMENTS

| EP | 3 279 227 A1 | 2/2018 |
| JP | 3-284326 A | 12/1991 |

(Continued)

OTHER PUBLICATIONS

English language machine translation of JP2014-073487, 21 pages, No Date.*

(Continued)

*Primary Examiner* — Pranav N Patel
(74) *Attorney, Agent, or Firm* — Birch, Stewart, Kolasch & Birch, LLP

(57) ABSTRACT

Disclosed is a porous hollow fiber membrane containing a polysulfone-based polymer as a main component, which has an asymmetric structure in which the inner surface side is dense and the outer surface side is coarse, wherein an average of a minor axis diameter of pores of an inner surface is 20 nm or more and 40 nm or less, an open porosity of the inner surface is 10% or more and 30% or less, and a polymer including a monocarboxylic acid vinyl ester unit is supported on at least one of the outer surface and the inner surface. The present invention provides a hollow fiber membrane which has excellent removing performance of substances to be separated such as viruses, and can be used (Continued)

as a separation membrane having high permeability even in a treatment under low pressure.

17 Claims, 3 Drawing Sheets

(51) Int. Cl.
*B01D 69/08* (2006.01)
*B01D 71/38* (2006.01)
*B01D 71/40* (2006.01)
*B01D 71/62* (2006.01)
*B01D 71/68* (2006.01)
*C08J 9/26* (2006.01)

(52) U.S. Cl.
CPC ............ *B01D 71/40* (2013.01); *B01D 71/62* (2013.01); *B01D 71/68* (2013.01); *C08J 9/26* (2013.01); *B01D 2317/02* (2013.01); *B01D 2319/04* (2013.01); *B01D 2325/023* (2013.01); *B01D 2325/04* (2013.01); *B01D 2325/341* (2022.08); *B01D 2325/36* (2013.01); *B01D 2325/38* (2013.01); *C08J 2381/06* (2013.01); *C08J 2439/06* (2013.01)

(58) Field of Classification Search
CPC ............... B01D 71/82; B01D 2323/02; B01D 2323/04; B01D 2323/18; B01D 2325/022; B01D 2325/34; B01D 2325/58; B01D 71/28; B01D 2325/023; A61M 1/1621
See application file for complete search history.

(56) References Cited

U.S. PATENT DOCUMENTS

| 2011/0017654 A1 | 1/2011 | Ueno et al. |
| 2012/0305472 A1 | 12/2012 | Yokota et al. |
| 2016/0220965 A1 | 8/2016 | Hayashi et al. |
| 2017/0072368 A1 | 3/2017 | Nosaka et al. |
| 2017/0361285 A1 | 12/2017 | Kayama et al. |
| 2018/0162977 A1 | 6/2018 | Ushiro et al. |

FOREIGN PATENT DOCUMENTS

| JP | 2010-53108 A | | 3/2010 |
| JP | 2010104984 A | * | 5/2010 |
| JP | 2014-73487 A | | 4/2014 |
| WO | WO 2009/123088 A1 | | 10/2009 |
| WO | WO 2013/012024 A1 | | 1/2013 |
| WO | WO 2016/158388 A1 | | 10/2016 |
| WO | WO 2018/025772 A1 | | 2/2018 |
| WO | WO 2018/082451 A1 | | 4/2018 |

OTHER PUBLICATIONS

Astakhov et al., Petroleum Chemistry, 2012, vol. 52, No. 8, pp. 557-564. (Year: 2012).*
English language machine translation of JP-2010104984-A, 21 pages, No Date.*
Singaporean Search Report and Written Opinion for Singaporean Application No. 11202010151S, dated Aug. 16, 2021.
International Search Report, issued in PCT/JP2019/020597, PCT/ISA/210, dated Jul. 23, 2019.
Written Opinion of the International Searching Authority, issued in PCT/JP2019/020597, PCT/ISA/237, dated Jul. 23, 2019.
Extended European Search Report for European Application No. 19806556.7, dated Nov. 16, 2021.

* cited by examiner

POROUS HOLLOW FIBER MEMBRANE

TECHNICAL FIELD

The present invention relates to a porous hollow fiber membrane for separating biological components.

BACKGROUND ART

In recent years, biopharmaceuticals, particularly antibodies such as immunoglobulins, have been widely used because of their high therapeutic effects and few side effects. Since antibodies are produced by organisms such as animal cells, there is a need to separate and purify only antibodies from many impurities in order to use them as pharmaceuticals. In a common separation/purification process, after cells used for antibody production are separated by centrifugation, separation/purification is performed using a column which specifically adsorbs the antibody (for example, protein A column), and finally viruses are removed.

As a method for removing viruses, it is effective that separation by sieve effect is performed by membrane filtration using a separation membrane because little influence is exerted on the active components such as antibodies, and it is possible to remove viruses which are resistant to energy and chemicals. This separation membrane for removing viruses is required to have high separation performance and to prevent viruses from leaking, and also to have high recovery rate of the antibody as an active ingredient.

As such virus removal membrane, the use of hollow fiber membranes used in industrial applications such as microfiltration and ultrafiltration, and medical applications such as hemodialysis is widespread. Patent Literature 1 discloses a hollow fiber membrane made of a blend of a polysulfone-based polymer and polyvinylpyrrolidone (PVP) for use in treating a protein-containing liquid. Patent Literature 2 discloses a porous hollow fiber membrane comprising a polysulfone-based polymer and a vinylpyrrolidone-vinyl acetate copolymer as two components and having a dense layer as an outer layer. Patent Literature 3 discloses a porous hollow fiber membrane comprising a polysulfone-based polymer and a hydrophilic polymer in which the thickness and the pore diameter of a dense layer are controlled.

CITATION LIST

Patent Literature

[Patent Literature 1]
 WO 2011/111679
[Patent Literature 2]
 WO 2013/012024
[Patent Literature 3]
 WO 2016/113964

SUMMARY OF INVENTION

Technical Problem

However, the hollow fiber membrane mentioned in Patent Literature 1 has a substantially homogeneous structure and tends to have low pure water permeability.

The hollow fiber membranes mentioned in Patent Literatures 2 and 3 contain a copolymer of vinylpyrrolidone and vinyl acetate to suppress clogging due to protein adhesion. However, since both hollow fiber membranes have low permeability, there is a need to treat under high pressure.

An object of the present invention is to provide a hollow fiber membrane which has excellent removing performance of substances to be separated such as viruses, and can be used as a separation membrane having high permeability even in a treatment under low pressure.

Solution to Problem

To solve the above problem, the present invention provides a porous hollow fiber membrane containing a polysulfone-based polymer as a main component, which has an asymmetric structure in which the inner surface side is dense and the outer surface side is coarse, wherein an average of a minor axis diameter of pores of an inner surface is 20 nm or more and 40 nm or less, an open porosity of the inner surface is 5% or more and 30% or less, and a polymer including a monocarboxylic acid vinyl ester unit is supported on at least one of the outer surface and the inner surface.

Advantageous Effects of Invention

According to the porous hollow fiber membrane of the present invention, it is possible to perform separation of biological components, particularly separation of proteins such as antibodies, from viruses under low pressure in a short time.

DESCRIPTION OF EMBODIMENTS

Figure 1:
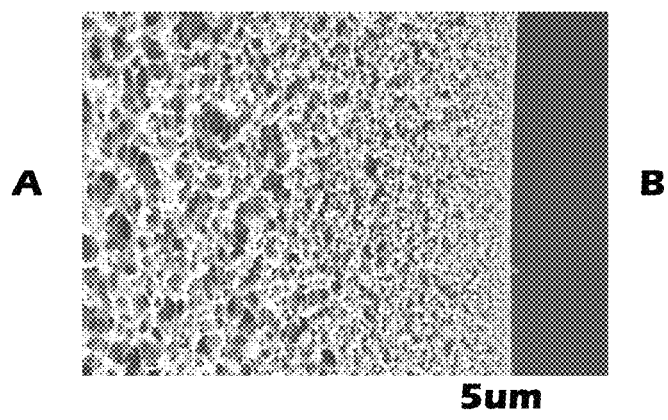
FIG. 1 is a SEM image of a cross-section of a porous hollow fiber membrane fabricated in Example 1 taken at 10,000 times.
Figure 2:
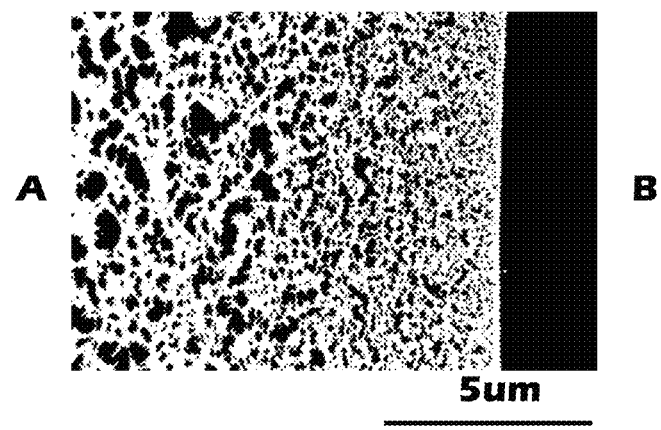
FIG. 2 is an image obtained by binarizing the image shown in FIG. 1.
Figure 3:
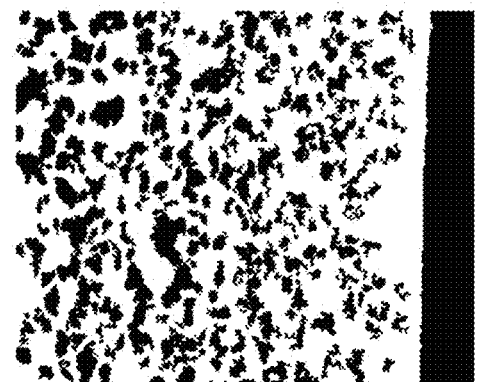
FIG. 3 is an image obtained by extracting only pores of 130 nm or more of a part of the image shown in FIG. 2.
Figure 4:
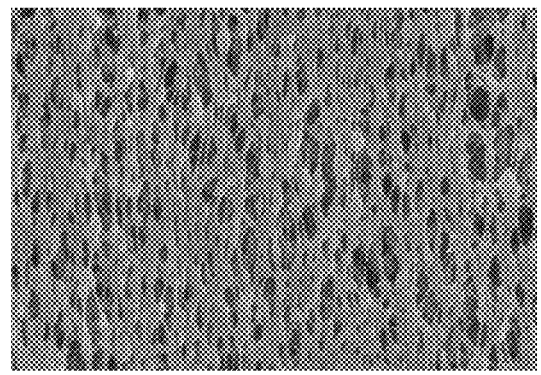
FIG. 4 is a SEM image of an inner surface of a hollow fiber membrane taken at 50,000 times.
Figure 5:
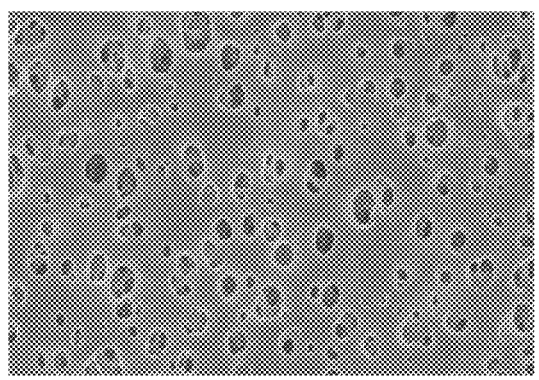
FIG. 5 is a SEM image of an outer surface of a hollow fiber membrane taken at 3,000 times.

Hereinafter, the present invention will be described in detail. As used herein, "to" represents a range including the lower limit value and the upper limit value.

<Porous Hollow Fiber Membrane>

The porous hollow fiber membrane of the present invention (hereinafter sometimes simply referred to as "hollow fiber membrane" and, for convenience of description, those in the state before supporting the below-mentioned coating polymer are sometimes referred to as "hollow fiber membrane") contains a polysulfone-based polymer as a main component.

The polysulfone-based polymer in the present invention is a polymer having an aromatic ring, a sulfonyl group and an ether group in the main chain, and specific examples thereof include polysulfone, polyether sulfone, polyallyl ether sulfone and the like. The polysulfone-based polymer used in the present invention is suitably a polymer including a repeating unit selected from repeating units represented by the following formulas (1) and (2).

[Chemical Formula 1]

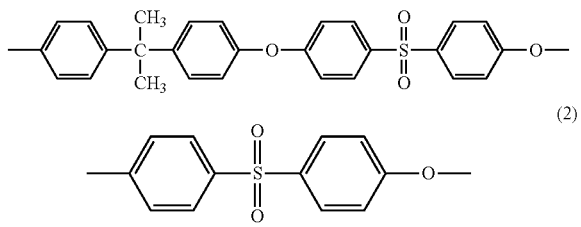

The polysulfone-based polymer may include other repeating units as long as it does not interfere with the effects of the present invention, together with the repeating unit represented by the formula (1) or (2). In this case, the content of other repeating units preferably accounts for 10% by mass or less of the polysulfone-based polymer. The polysulfone-based polymer may have a hydrogen atom in the hydrocarbon skeleton substituted with other atoms such as an alkyl group, a functional group or a halogen, or may be a modified body.

In the present invention, a polysulfone-based polymer represented by the following formula (3) or (4), which is composed of only the repeating unit represented by the above formula (1) or (2), is preferably used, but is not limited.

[Chemical Formula 2]

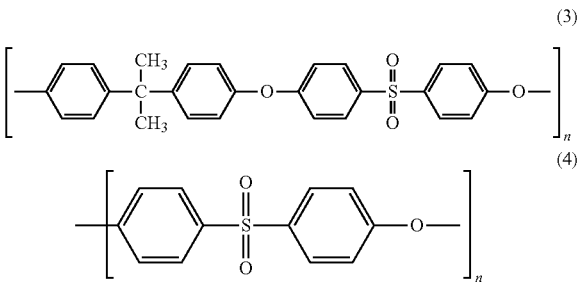

$n$ in the formulas (3) and (4) represents an integer of 50 or more, and preferably an integer of 50 to 200.

Specific examples of such polysulfone-based polymer include "Udel" (registered trademark) P-1700 and P-3500 (manufactured by Solvay Corp.), "Ultrason" (registered trademark) S3010 and S6010 (manufactured by BASF Corporation) and the like.

The above polysulfone-based polymers may be used alone, or in combination of two or more thereof.

"Containing a polysulfone-based polymer as a main component" means that, the polysulfone-based polymer of the components constituting the hollow fiber membrane accounts for 50% by mass or more of the entire components. The content of the polysulfone-based polymer is preferably 75% or more, and more preferably 90% or more, of the components constituting the hollow fiber membrane.

According to a preferred embodiment, the hollow fiber membrane of the present invention further contains a hydrophilic polymer. That is, the hollow fiber membrane of the present invention is preferably composed of a mixed resin of the polysulfone-based polymer and a hydrophilic polymer. The hydrophilic polymer has a role of adjusting the viscosity of a pore forming agent and a spinning dope solution when the porous hollow fiber membrane is formed using the polysulfone-based polymer, and imparting the effect of suppressing protein adhesion. The hydrophilic polymer in the present invention means a polymer soluble in water or ethanol, and is preferably a polymer soluble therein in an amount of 0.1 g/mL or more.

The hydrophilic polymer is preferably a hydrophilic polymer which is compatible with a good solvent for the polysulfone-based polymer and the polysulfone-based polymer. Examples of such hydrophilic polymer include polyvinylpyrrolidone, polyethylene glycol, polyvinyl alcohol, and copolymers thereof. Examples of the copolymer include, but are not particularly limited to, a copolymer of vinylpyrrolidone and a component selected from vinyl acetate, vinyl propionate and vinyl butanoate. Of these, polyvinylpyrrolidone or a copolymer thereof is preferably used from the viewpoint of the compatibility with the polysulfone-based polymer.

From the viewpoint of the role as a pore forming agent and the effect of suppressing protein adhesion, the content of the hydrophilic polymer in the hollow fiber membrane is preferably 0.5% by weight or more, and more preferably 1.0% by weight or more. Meanwhile, if the content of the hydrophilic polymer is too large, it may be difficult to form a membrane, and elution from the hollow fiber membrane may occur. Therefore, the content of the hydrophilic polymer is preferably 10% by mass or less, and more preferably 8% by weight or less.

Commonly, the hollow fiber membrane includes a so-called symmetric membrane having a symmetric structure in which a pore diameter hardly varies in the thickness direction, and a so-called asymmetric membrane having an asymmetric structure in which a pore diameter varies in the thickness direction. The porous hollow fiber membrane of the present invention is an asymmetric membrane having an asymmetric structure in which the inner surface side is dense and the outer surface side is coarse. In other words, the porous hollow fiber membrane has a structure in which the inner surface side has a small pore diameter and the outer surface side has a large pore diameter. Such asymmetric membrane has an advantage that it is easy to control the pore diameter of the dense layer which is important for substance separation. In the asymmetric membrane, since a region having a small pore diameter, which contributes to removal of substances to be removed such as viruses, and a region having a large pore diameter, which lowers water permeation resistance, it is easy to achieve both separation performance and water permeability.

According to a preferred embodiment, in the hollow fiber membrane of the present invention, the thickness of a layer with no pores having a pore diameter of 130 nm or more on the inner surface side (hereinafter referred to as dense layer) is 1 μm or less. The thickness of the dense layer can be determined by observing a cross-section perpendicular to the axial direction of the hollow fiber membrane using a scanning electron microscope (SEM) at a magnification of 10,000 times, and analyzing the photographed image with image processing software. Specifically, first, a threshold value is determined by binary coded processing in such a manner that a structural part had a light brightness value and the parts other than the structural part had a dark brightness value. Then, in the hollow fiber membrane, when the shape is assumed to be a perfect circle, a region where a dark luminance portion of an area of $1.3 \times 10^4$ $(nm^2)$ or more whose diameter is 130 nm is not observed is specified as a dense layer, and the average of the thickness of the dense layer in the cross-section is determined. More specifically, it is measured by the method of "(6) Measurement of Thickness of Dense Layer" mentioned later.

In the hollow fiber membrane of the present invention, the substance is mainly separated in this dense layer. However, if the dense layer is too thick, resistance increases when a process liquid such as water permeates. To obtain high permeability, the thickness of the dense layer is preferably 1 µm or less, more preferably 0.8 µm or less, still more preferably 0.5 µm or less, and yet more preferably 0.2 µm or less. Meanwhile, when the thickness of the dense layer is extremely thin, the separation performance may deteriorate depending on the processing conditions. Therefore, the thickness of the dense layer is preferably 0.05 µm or more, and more preferably 0.1 µm or more.

The size of the substance to be separated in the hollow fiber membrane of the present invention depends on the shape of pores of the inner surface. The pores of the inner surface of the hollow fiber membrane are often elliptic rather than perfectly circular. However, since the shorter diameter (minor axis diameter) of elliptical pores contributes to the separation of substances, in the present invention, it is important to control the minor axis diameter of pores of the inner surface. For example, in the production of biopharmaceuticals, it is required to separate antibodies (about 8 to 10 nm) as useful substances from a multimer thereof, and to separate antibodies from various viruses (about 30 to 100 nm). From the viewpoint of the permeability of the antibody as a useful substance, the average of the minor axis diameter of pores of the inner surface is preferably 20 nm or more, more preferably 22 nm or more, and still more preferably 25 nm or more. Meanwhile, from the viewpoint of the separation performance, the average of the minor axis diameter of pores of the inner surface is preferably 40 nm or less, more preferably 38 nm or less, and still more preferably 35 nm or less. It is preferable that the longer diameter (major axis diameter) of elliptical pores is increased because the open porosity of the membrane surface can be increased. The ratio of the major axis diameter to the minor axis diameter of pores of the inner surface (major axis diameter/minor axis diameter) is preferably 2 or more, and more preferably 2.5 or more. Meanwhile, if the ratio of the major axis diameter to the minor axis diameter becomes too large, the strength of the membrane may decrease. Therefore, the major axis diameter/minor axis diameter is preferably 6 or less, and more preferably 5 or less. The minor axis diameter and major axis diameter of pores of the dense layer herein are averages, and specifically, they are measured by the method of "(4) Measurement of Surface Pore Diameter" mentioned later.

The open porosity of the inner surface exerts a huge influence on the permeability of the hollow fiber membrane. When the open porosity is small, the flow passage through which the substance can permeate are reduced, leading to an increase in permeation resistance. Therefore, in the hollow fiber membrane of the present invention, the open porosity of the inner surface is 5% or more, preferably 10% or more, and more preferably 15% or more. Meanwhile, if an attempt is made to increase the open porosity of the inner surface, it may become difficult to control the pore diameter and the pore structure may easily change when the pressure is applied. Therefore, the open porosity of the inner surface is 30% or less, and preferably 25% or less. The open porosity of the inner surface of the hollow fiber membrane is measured by the method of "(5) Measurement of Open Porosity" mentioned later.

As used herein, a layer other than the dense layer, which exists outside the dense layer of the hollow fiber membrane of the present invention, that is, exists on the outer surface side of the dense layer in the hollow fiber membrane, is referred to as a coarse layer. The coarse layer preferably has a structure in which the pore diameter gradually increases from the dense layer side toward the outer surface side so as to minimize the permeation resistance. From the viewpoint of the strength of the hollow fiber membrane, it is preferable that macrovoids, which are pore regions where the substantial part of the membrane is clearly deleted in a shape of ellipse or liquid drop, are not observed in the coarse layer.

From the viewpoint of the permeability, the average of the minor axis diameter of pores of the outer surface of the hollow fiber membrane, that is, the outer surface of the coarse layer is preferably 0.2 µm or more, and more preferably 0.3 µm or more. Meanwhile, from the viewpoint of the strength of the hollow fiber membrane, the average of the minor axis diameter of pores of the outer surface is preferably 2 µm or less, and more preferably 1.5 µm or less. From the viewpoint of the permeability, the open porosity of the outer surface is preferably 1% or more, more preferably 3% or more, and still more preferably 5% or more. Meanwhile, from the viewpoint of the strength, the open porosity of the outer surface is preferably 20% or less, and more preferably 15% or less.

The crushability of the hollow fiber membrane has a correlation with the thickness and the inner diameter of the hollow fiber membrane. As the thickness of the hollow fiber membrane becomes thinner, the membrane mass transfer coefficient of the membrane can be reduced, leading to an improvement in substance removing performance of the hollow fiber membrane. Meanwhile, if the thickness is too thin, fiber breakage and dry crushing tend to occur, which may cause problems with production. Therefore, the thickness of the hollow fiber membrane is preferably 20 µm or more, and more preferably 30 µm or more. Meanwhile, the thickness of the hollow fiber membrane is preferably 100 µm or less, more preferably 80 µm or less, and still more preferably 60 µm or less. The inner diameter of the hollow fiber membrane is preferably 150 µm or more, more preferably 200 µm or more, and still more preferably 220 µm or more, while the inner diameter of the hollow fiber membrane is preferably 500 µm or less, more preferably 400 µm or less, and still more preferably 300 µm. The inner diameter of the hollow fiber membrane refers to the value calculated by the following formula after measuring the thicknesses of the hollow fiber membrane using a 1,000 times lens of MICROWATCHER (for example, VH-Z100; KEYENCE CORPORATION).

Inner diameter of hollow fiber membrane=outer diameter of hollow fiber membrane−(thickness×2)

The outer diameter of the hollow fiber membrane refers to the value determined by measuring the outer diameter of the hollow fiber membrane using a laser displacement meter (for example, LS5040T; KEYENCE CORPORATION).

In the porous hollow fiber membrane of the present invention, a polymer including a monocarboxylic acid vinyl ester unit (hereinafter sometimes referred to as "coating polymer") is supported on at least one of the outer surface and the inner surface of the hollow fiber membrane. In particular, the coating polymer is preferably supported at least on the inner surface with which the liquid to be treated first comes into contact, and more preferably supported on both the inner surface and the outer surface. It is still more preferable that the coating polymer is also supported inside the porous layer (general term of the dense layer and the coarse layer mentioned above) of the hollow fiber membrane. By supporting the coating polymer on the inner surface and the outer surface, and inside the porous layer, it is possible to effectively suppress adhesion of proteins, etc.

The monocarboxylic acid means a compound composed of one carboxy group and a hydrocarbon group bonded to the carbon atom of the carboxy group, that is, a compound represented by "R—COOH" (R is a hydrocarbon group). The hydrocarbon group R may be either an aliphatic hydrocarbon group or an aromatic hydrocarbon group, but is preferably an aliphatic hydrocarbon group, and particularly a saturated aliphatic hydrocarbon group, from the viewpoint of ease of synthesis, etc. From the viewpoint of the production cost of carboxylic acid, the saturated aliphatic hydrocarbon group preferably has a linear structure or a branched structure, and more preferably a linear structure. Examples of the monocarboxylic acid in which R is an aromatic hydrocarbon group include benzoic acid and derivatives thereof. Examples of the monocarboxylic acid in which R is a saturated aliphatic hydrocarbon group include acetic acid, propanoic acid, butyric acid and the like.

The saturated aliphatic hydrocarbon group may have not only a linear structure such as an ethyl group, an n-propyl group, an n-butyl group, an n-pentyl group or an n-hexyl group, but also have a branched structure such as an isopropyl group or an tertiary butyl group, or a cyclic structure such as a cyclopropyl group or a cyclobutyl group. The saturated aliphatic hydrocarbon group may also have an ether bond or an ester bond in the aliphatic chain. The hydrogen atom of the hydrocarbon group R may be substituted with an optional substituent. However, if the terminal hydrogen atom is substituted with an anionic functional group such as a sulfonic acid group, it is preferable that the terminal hydrogen atom is not substituted with an anionic functional group since the structure of proteins may be made unstable to induce adhesion to the surface of the hollow fiber membrane.

It is preferable that small number of carbon atoms of the hydrocarbon group R causes deterioration of the hydrophobicity of the monocarboxylic acid, reduction of the hydrophobic interaction with proteins, and prevention of adhesion. Therefore, when R is an aliphatic hydrocarbon group or an aromatic hydrocarbon group, the number of carbon atoms is preferably 1 to 20, more preferably 1 to 9, and still more preferably 2 to 5. When R is a saturated aliphatic hydrocarbon group, the compound having one carbon atom is acetic acid and the compound having two carbon atoms is propanoic acid.

As used herein, "unit" refers to a repeating unit of a homopolymer or a copolymer obtained by polymerizing a monomer, and "carboxylic acid vinyl ester unit" means a repeating unit obtained by polymerizing a carboxylic acid vinyl ester monomer, that is, a repeating unit represented by "—CH(OCO—R)—CH$_2$—" (R is an aliphatic hydrocarbon group or an aromatic hydrocarbon group). R is the same as mentioned for the monocarboxylic acid, and preferred examples and the like are also as mentioned above.

Specific examples of the monocarboxylic acid vinyl ester unit in which R is saturated aliphatic include a vinyl propanoate unit, a vinyl pivalate unit, a vinyl decanoate unit, a methoxyvinyl acetate unit and the like. Since it is preferable that the hydrophobicity is not too strong, preferred examples include a vinyl acetate unit (R: CH$_3$), a vinyl propanoate unit (R: CH$_2$CH$_3$), a vinyl butyrate unit (R: CH$_2$CH$_2$CH$_3$), a vinyl pentanoate unit (R: CH$_2$CH$_2$CH$_2$CH$_3$), a vinyl pivalate unit (R: C(CH$_3$)$_3$) and a vinyl hexanoate unit (R: CH$_2$CH$_2$CH$_2$CH$_2$CH$_3$). Specific examples of the monocarboxylic acid vinyl ester unit in which R is aromatic include a vinyl benzoate unit and substitution products thereof.

It is possible to confirm the fact that the polymer including the monocarboxylic acid vinyl ester unit is supported on the outer or inner surface of the hollow fiber membrane by using composition analysis by a TOF-SIMS apparatus in combination with the measurement by X-ray photoelectron spectroscopy (XPS). Specifically, first, since a peak derived from carboxylic acid ions of the monocarboxylic acid vinyl ester unit is detected by the composition analysis by the TOF-SIMS apparatus, the structure of carboxylic acid becomes clear by analyzing the mass (m/z).

In the composition analysis by the TOF-SIMS apparatus, pulsed ions (primary ions) are irradiated on a surface of a sample put in an ultrahigh vacuum, and ions (secondary ions) emitted from the surface of the sample get constant kinetic energy, and then guided to a time-of-flight mass spectrometer. Each of the secondary ions accelerated by the same energy passes through an analyzer at a speed according to the mass. However, since the distance to a detector is constant, the time to reach there (flight time) becomes a mass function and the mass distribution, that is, the mass spectrum of secondary ions is obtained by precisely measuring the distribution of the time of flight. For example, when secondary negative ions are detected using Bi$_3^{++}$ as primary ion species, the peak at m/z=59.02 corresponds to C$_2$H$_3$O$_2^-$, that is, acetic acid (carbon number of aliphatic chain: 1), and the peak at m/z=73.04 corresponds to C$_3$H$_5$O$_2^-$, that is, propanoic acid (carbon number of aliphatic chain: 2).

The conditions for composition analysis by the TOF-SIMS apparatus are as follows. The measurement region is 200 μm×200 μm, the primary ion acceleration voltage is 30 kV, and the pulse width is 5.9 nm. The detection depth in this analysis method is several nm or less. At this time, if the carboxylate ion strength with respect to the total secondary ion strength is 0.4% or less, it is determined to be noise, and carboxylic acid ions do not exist. More specifically, it is measured according to "(7) Measurement of TOF-SIMS" mentioned later.

When the XPS measurement is further performed, a carbon peak derived from an ester group (COO) appears at +4.0 to 4.2 eV from a main peak of CH$_x$ or C—C (around 285 eV), and thus it can be seen that the carboxylic acid forms an ester bond. The value measured at 90° is used as a measurement angle of XPS. When measuring at the measurement angle of 90°, a region from the surface to a depth of about 10 nm is detected. At this time, when the ratio of the peak area derived from the ester group to the total peak area derived from carbon is 0.4% or less, it is determined to be noise and the ester group does not exist. More specifically, the measurement is performed according to "(8) Measurement of X-Ray Electron Spectroscopy (XPS)" mentioned later.

From the above two measurement results, the presence or absence of the polymer including the vinyl monocarboxylic acid ester unit on the surface of the porous hollow fiber membrane becomes clear.

Further, the amount of the coating polymer existing on the surface of the porous hollow fiber membrane or inside the porous layer can be determined by measuring the amount of carbon derived from the ester group using XPS.

The carbon peak derived from an ester group (COO) can be determined by deconvoluting peaks observed in the range from the main C1s peak derived from CH or C—C to the peak at +4.0 to +4.2 eV. The content of carbon derived from an ester group (atomic %) is determined by calculating the ratio of the peak area derived from an ester group to the total peak area derived from carbon. More specifically, C1s peaks are composed of five components: a component mainly derived from $CH_x$, C—C, C=C and C—S; a component mainly derived from C—O and C—N; a component derived from $\pi$-$\pi$* satellite; a component derived from C=O; and a component derived from COO. Therefore, the peaks are deconvoluted into the five components. The COO-derived component corresponds to the peak observed at +4.0 to +4.2 eV from the main $CH_x$ or C—C peak (around 285 eV). The peak area ratio of each component is calculated by rounding off the second decimal place.

In order to exert the effect of suppressing adhesion of protein, an area percentage of a carbon peak derived from an ester group, when the measurement is performed on at least one surface of the outer surface or the inner surface of the porous hollow fiber membrane by XPS, on the assumption that the total peak area derived from carbon is 100 (atomic %), is preferably 0.1 (atomic %) or more, more preferably 1.0 (atomic %) or more, and still more preferably 1.5 (atomic %) or more. Meanwhile, in order to prevent deterioration of the permeability of the hollow fiber membrane, it is preferable that the amount of the polymer including the monocarboxylic acid ester vinyl unit supported on the outer or inner surface is not too large. From the viewpoint of preventing deterioration of the permeability, the area percentage of a carbon peak derived from an ester group is preferably 25 (atomic %) or less, more preferably 20 (atomic %) or less, and still more preferably 10 (atomic %) or less.

At the time of XPS measurement, the measurement is performed at two points of the porous hollow fiber membrane, and the average of the values at the two points is used.

It is possible to measure the amount of the ester group with respect to the polysulfone-based polymer on the surface of the porous hollow fiber membrane by attenuated total reflection (ATR). Specifically, the infrared absorption spectrum is measured at 25 points on the surface of the porous hollow fiber membrane, with the measurement range at one location being 3 μm×3 μm and the number of times of integration being 30 times or more. A base line is drawn on the resulting infrared absorption spectrum in a range of 1,711 to 1,759 cm$^{-1}$, and the peak area surrounded by the base line and the positive part of the spectrum is determined to be the peak area ($A_{COO}$) derived from an ester group. Similarly, a base line is drawn in a range of 1,549 to 1,620 cm$^{-1}$, and the peak area surrounded by the base line and the positive part of the spectrum is determined to be the peak area ($A_{CC}$) derived from a benzene ring C=C of polysulfone. The ratio between them ($A_{COO}$)/($A_{CC}$) is then calculated to obtain an average of 25 points. The calculation of the average is performed for three different places in the vicinity of both ends and around the longitudinal center per one hollow fiber membrane, and an average of 3 points is determined to be an average of ($A_{coo}$)/($A_{cc}$) in the hollow fiber membrane measured. More specifically, the measurement is performed according to "(9) Microscopic ATR Method" mentioned later. The average of ($A_{COO}$)/($A_{CC}$) of this hollow fiber membrane is preferably 0.01 or more, more preferably 0.03 or more, and still more preferably 0.05 or more. Meanwhile, too large proportion of the ester group may lead to strong hydrophobicity of the surface, resulting in deterioration of the effect of suppressing protein adhesion, so that the average of ($A_{COO}$)/($A_{CC}$) is preferably 1 or less, more preferably 0.5 or less, and still more preferably 0.3 or less.

In each of the above measurements, for example, when detecting on the inner surface of the hollow fiber membrane, a hollow fiber membrane is sliced into a semi-cylindrical shape using a single-edged knife and a sample with the inner surface of the hollow fiber membrane exposed is prepared, and then the inner surface is measured. When detecting on the outer surface of the hollow fiber membrane, the outer surface is measured with the same sample as the measurement of the inner surface. When measuring the inside of a hollow fiber membrane, the hollow fiber membrane is wetted by immersing in water for 5 minutes, frozen with liquid nitrogen, quickly folded and then freeze-dried. A cross-section of the frozen-dried hollow fiber membrane or the thickness part of the hollow fiber membrane is sliced using a single-edged knife and then a sample with the inner surface of the hollow fiber membrane exposed is measured.

The number-average molecular weight of the coating polymer is preferably 1,000 or more, and more preferably 5,000 or more, from the viewpoint of sufficiently suppressing adhesion of proteins. Meanwhile, the upper limit of the number-average molecular weight of the polymer is not particularly limited, but is preferably 1,000,000 or less, more preferably 500,000 or less, and still more preferably 100,000 or less, from the viewpoint of avoiding a decrease in introduction efficiency into the hollow fiber membrane. The number-average molecular weight of the homopolymer or the copolymer can be measured by gel permeation chromatography (GPC).

The coating polymer is preferably a copolymer composed of a hydrophilic unit and a hydrophobic unit (hereinafter sometimes simply referred to as "copolymer"). It has been found that when the surface of the hollow fiber membrane is coated with a hydrophilic polymer such as polyethylene glycol or polyvinyl alcohol, the effect of suppressing adhesion of proteins, etc. is insufficient. This is presumably because if the surface of the hollow fiber membrane is too hydrophilic, the structure of proteins becomes unstable, failing to sufficiently suppress adhesion of proteins. In particular, in recent years, attention has been paid to water around polymers. In a highly hydrophilic polymer, the interaction between the polymer and water is strong, leading to deterioration of the mobility of water around the polymer. Meanwhile, the structure of proteins is considered to be stabilized by water called adsorbed water. Therefore, it is considered that the structure of proteins is not stabilized and adhesion of proteins to the surface of the hollow fiber membrane can be suppressed if the mobility of water adsorbed by the protein and the water around the polymer are close to each other. In the copolymer composed of a hydrophilic unit and a hydrophobic unit, it is considered possible to control the mobility of water around the polymer by controlling the hydrophilic group, the hydrophobic group and the copolymerization ratio. Herein, the hydrophilic unit refers to a polymer in which a polymer having a weight-average molecular weight of 10,000 to 1,000,000 is soluble in water when a polymer is produced from a monomer constituting the unit. "Soluble" refers to those having a solubility in 100 g of water at 20° C. of more than 0.1 g.

As the monomer constituting the hydrophilic unit, a monomer having the solubility of more than 10 g is more preferable. Examples of such monomer include a vinyl alcohol monomer, an acryloylmorpholine monomer, a vinyl pyridine monomer, a vinyl imidazole monomer, a vinyl pyrrolidone monomer and the like. Of these, a monomer having an amide bond, an ether bond or an ester bond is preferable because it is not too hydrophilic and easily balances with a hydrophobic monomer as compared with a monomer having a carboxy group or a sulfonic acid group. In particular, a vinylacetamide monomer having an amide bond, a vinylpyrrolidone monomer and a vinylcaprolactam monomer are more preferable. Of these, a vinylpyrrolidone monomer is more preferable because the polymer has low toxicity. Therefore, according to a preferred embodiment of the present invention, the coating polymer includes a vinylpyrrolidone unit as a hydrophilic unit.

The monomer constituting the hydrophobic unit includes at least monocarboxylic acid vinyl ester, but may further include a unit selected from acrylic acid ester, methacrylic acid ester, vinyl-s-caprolactam and the like.

From the viewpoint of suppressing protein adhesion, the molar fraction of the hydrophobic unit in the copolymer composed of the hydrophilic unit and the hydrophobic unit is preferably 10% or more and 90% or less, more preferably 20% or more and 80% or less, and still more preferably 30% or more and 70% or less. At this time, the hydrophobic unit may be a monocarboxylic acid vinyl ester unit alone, or may further include other hydrophobic units. It is preferable to set the molar fraction of the hydrophobic unit at the upper limit or less in order to suppress an increase in hydrophobicity of the entire copolymer and avoid adhesion of proteins. It is preferable that setting the molar fraction of the hydrophobic unit at the above lower limit or more suppresses an increase in hydrophilicity of the entire copolymer and avoids the structural destabilization and denaturation of the protein, leading to prevention of adhesion of proteins. The method of calculating the molar fraction is, for example, by performing nuclear magnetic resonance (NMR) measurement and calculating from the peak area ratio of the peaks corresponding to the respective components. When the molar fraction cannot be calculated by NMR measurement due to overlapping peaks, the molar fraction may be calculated by elemental analysis.

As the coating polymer, a copolymer composed of a monocarboxylic acid vinyl ester unit and a vinylpyrrolidone unit is particularly preferable. In this case, the molar ratio of the vinylpyrrolidone unit to the monocarboxylic acid vinyl ester unit is preferably 30:70 to 90:10, more preferably 40:60 to 80:20, and still more preferably 50:50 to 70:30.

Examples of the arrangement of the units in the above copolymer include a block copolymer, an alternating copolymer, a random copolymer and the like. Of these, the alternating copolymer or the random copolymer is preferable in view of small distribution unevenness of the hydrophilic unit and the hydrophobic unit in the entire copolymer. Of these, a random copolymer is more preferable because it is easy to synthesize.

Although not essential, it is preferable that the coating polymer is immobilized on the hollow fiber membrane by a chemical bond from the viewpoint of avoiding elution of the coating polymer during use. The immobilization method will be described later.

The water permeability of the porous hollow fiber membrane of the present invention is preferably high from the viewpoint of shortening the treatment time and downsizing the hollow fiber membrane module and auxiliary equipment. The water permeability is preferably 1 L/(hr·kPa·m$^2$) or more, more preferably 3 L/(hr·kPa·m$^2$) or more, and still more preferably 10 L/(hr·kPa·m$^2$) or more. Meanwhile, if the water permeability is too high, the contact rate of proteins with the hollow fiber membrane may be increased and the protein may be denatured. Therefore, the water permeability is preferably 50 L/(hr·kPa·m$^2$) or less.

In the production process of biopharmaceuticals, the virus clearance required for the entire process is 99.9999999% or more (LRV=9). It is also considered desirable to consider two or more different virus inactivation and removal steps. Therefore, it is preferable that such porous hollow fiber membrane has a virus clearance of at least 99.99% or more (LRV=4).

Antibodies are expensive among biopharmaceuticals. Since various separations and purifications are performed in the production process, there is a need to suppress antibody loss as much as possible. In particular, a separation membrane, etc. has a large surface area, so that antibodies are easily adsorbed and the recovery rate easily decreases. In particular, when the treatment is performed using a plurality of separation membranes sequentially, a decrease in antibody recovery rate due to adhesion to the separation membranes becomes a serious problem. Therefore, the recovery rate of antibodies is preferably 80% or more, more preferably 85% or more, and still more preferably 90% or more.

Further, when antibodies or proteins to be removed adhere to the hollow fiber membrane, the amount of the process liquid decreases with the passage of the treatment time, leading to the extension of the treatment time and the reduction of the antibody recovery rate. Therefore, it is preferable that the amount of the process liquid does not decrease as the treatment time elapses. For example, when the liquid to be treated is treated under low pressure of 20 to 50 kPa, the ratio of the amount of the process liquid recovered during 25 to 30 minutes or during 55 to 60 minutes to the amount of the process liquid recovered during the first 0 to 5 minutes is preferably 0.7 or more, more preferably 0.8 or more, and still more preferably 0.9 or more. When the liquid to be treated is treated under low pressure of 20 to 50 kPa, the antibody permeability maintenance rate calculated as the antibody permeability during 25 to 30 minutes to the antibody permeability during the first 0 to 5 minutes is preferably 80% or more, more preferably 85% or more, and still more preferably 90% or more.

Antibodies may form aggregates to which some antibodies are bound during the production process. Such aggregates have no medicinal effect and are treated as impurities, and are therefore required to be removed in the production process. The content of the antibody aggregates is preferably 2% or less, more preferably 1% or less, and still more preferably 0%, with respect to the antibody monomer. The content of antibody aggregates can be analyzed by a light scattering method, size exclusion chromatography or the like.

A common production process of biopharmaceuticals comprises a process of culturing cells which produce antibodies, a process of separating cells from the antibodies, a process of recovering and purifying the antibodies thus produced, a virus inactivation process, and a virus removal process. A centrifugation method or a depth filtration method is used in the process of separating cells from antibodies. To recover the thus produced antibodies, a protein A column on which protein A specifically adsorbing the antibodies is immobilized is mainly used. In the purification process, a cation exchange column or anion exchange column is used to remove the animal cell-derived protein (HostCell Protein) used for the production of antibodies. In the virus inactivation process, low pH treatment is commonly performed to adjust the pH to 4 or lower.

Since the hollow fiber membrane of the present invention has excellent antibody permeability as mentioned above, it is possible to apply the hollow fiber membrane of the present invention to the process of separating antibody-producing cells from antibodies after the step of culturing the cells. Since the size of cells used for the production of antibodies is commonly 8 to 20 µm, it is possible to separate using the porous hollow fiber membrane of the present invention. It is also possible to remove antibody aggregates, etc. which are formed by association of a plurality of antibodies, which are difficult to remove with a protein A column in the antibody recovery process. It is difficult to remove antibody aggregates (about 40 to 80 nm) with a protein A column which separates using a specific interaction with the antibodies. However, when the porous hollow fiber membrane of the present invention is used, antibody aggregates can be separated from the antibodies by size difference. In the antibody purification process, the hollow fiber membrane or the hollow fiber membrane module of the present invention can be applied to the process of separating antibodies from the antibody aggregates.

It is also preferable to use the hollow fiber membrane of the present invention as a virus removal membrane in the final stage of the production process of biopharmaceuticals mentioned above. Furthermore, after performing steps such as cell separation, antibody recovery and purification using separation membranes each having various pore sizes according to the size of the substance to be removed in each stage of the above production process, the hollow fiber membrane of the present invention can also be used as the virus removal membrane.

In particular, in current production process of biopharmaceuticals, there is a problem that the efficiency is poor because each process is performed in a batch system. The problem can be solved by using the porous hollow fiber membrane or the hollow fiber membrane module of the present invention as a purification system. Specifically, it is a purification system for obtaining desired cells or proteins from a solution containing cells and proteins, including the porous hollow fiber membrane according to the present invention and a separation membrane having pores each having a diameter smaller than that in the hollow fiber membrane of the present invention, wherein the porous hollow fiber membrane and the separation membrane are arranged such that the solution is sequentially treated by the porous hollow fiber membrane of the present invention and the separation membrane. By using this purification system, a solution containing cells and proteins can be sequentially treated by sequentially arranging separation membranes each having different pore sizes, and desired cells or proteins can be purified and recovered, leading to high productivity, which is preferable.

The hollow fiber membrane of the present invention can be used not only in the production process of biopharmaceuticals but also in the virus removal process of blood products.

<Method for Producing Porous Hollow Fiber Membrane>

As the method for producing a porous hollow fiber membrane of the present invention, a phase separation method is preferable. It is possible to use, as the phase separation method, a so-called non-solvent induced phase separation method which induces phase separation with a poor solvent, or a so-called thermally induced phase separation method which induces phase separation by cooling a high-temperature spinning dope solution using a solvent having relatively low solubility. Of these, membrane formation by a method of inducing phase separation with a poor solvent is particularly preferable.

In this membrane forming process, phase separation proceeds due to contact between the spinning dope solution and the poor solvent, and the structure of the porous hollow fiber membrane is determined. In particular, when a liquid containing a poor solvent as an injection liquid is ejected to the inside of the double tube spinneret and the spinning dope solution is allowed to flow to the outside to form a membrane, phase separation starts from the inside (inner surface) of the hollow fiber membrane in which the spinning dope solution and the poor solvent contact each other. Then, the poor solvent diffuses in the membrane thickness direction and the phase separation continuously progresses. At this time, the pore diameter of the inner surface of the porous hollow fiber membrane with the highest concentration of the poor solvent is the smallest and the inner surface side has a dense structure, while the pore diameter increases and the structure becomes coarse gradually from the inner surface side to the outer surface side of the hollow fiber membrane. It is possible to adjust the pore diameter of the inner surface and the thickness of the dense layer by controlling the phase separation rate mentioned above. Specific examples thereof include adjustment of the poor solvent concentration of the injection liquid, the ejection temperature of the spinning dope solution, the concentration of the polysulfone-based polymer in the spinning dope solution and the like. In particular, changing the poor solvent concentration of the injection liquid is effective for adjusting the pore size and the dense layer. By adjusting the concentration of the poor solvent in the injection liquid, the diffusion rate of the poor solvent changes, and the pore diameter on the surface of the hollow fiber membrane and the thickness of the dense layer can be controlled. By increasing the concentration of the polysulfone-based polymer in the spinning dope solution, the polysulfone-based polymer, which is the main component of the hollow fiber membrane, densely exists, thus making it possible to increase the thickness of the dense layer.

As the polysulfone-based polymer to be mixed in the spinning dope solution, the above-mentioned polymers can be used, and the polymer may be used alone, or in combination of two or more thereof.

The mechanical strength of the hollow fiber membrane can be increased by increasing the concentration of the polysulfone-based polymer in the spinning dope solution. Meanwhile, too large concentration of the polysulfone-based polymer may cause problems such as decrease in solubility and poor ejection due to an increase in viscosity of the spinning dope solution. The concentration of the polysulfone-based polymer enables the adjustment of permeability and molecular weight cutoff. Excessive increase in concentration of the polysulfone-based polymer may cause an increase in the density of the polymer on the inner surface of hollow fiber membrane, leading to deterioration of permeability and molecular weight cutoff. Thus, the concentration of the polysulfone-based polymer in the spinning dope solution is preferably 30% by mass or less, while the lower limit of the concentration of the polysulfone-based polymer in the spinning dope solution is preferably 10% by mass or more.

When the polysulfone-based polymer is dissolved in the solvent, the polymer is preferably dissolved at high temperature so as to improve solubility, but may cause denaturation of the polymer due to heat, and change in composition due to vaporization of the solvent. Therefore, the dissolving temperature is preferably 30° C. or higher and 120° C. or lower. Optimum range of the dissolving temperature sometimes varies depending on the type of the polysulfone-based polymer and additives.

Furthermore, by mixing a hydrophilic polymer in the spinning dope solution, as mentioned above, the effect of improving the water permeability as a pore forming agent and the effect of suppressing adhesion of proteins by improving the hydrophilicity can be expected. By mixing the hydrophilic polymer, it is possible to adjust the viscosity of the spinning dope solution, and it is possible to suppress the generation of macrovoids which cause a decrease in strength of the membrane. However, if the content of the hydrophilic polymer in the spinning dope solution is too large, the solubility of the spinning dope solution may decrease and the ejection may be poor. When a large amount of the polymer remains in the hollow fiber membrane, there is a possibility that the water permeability may deteriorate due to an increase in permeation resistance. As the hydrophilic polymer, polymers mentioned above can be used, and the polymers may be used alone, or in combination of two or more thereof. The optimum amount of the hydrophilic polymer to be added to the spinning dope solution varies depending on the type and the objective performance, but is preferably 1% by mass or more and 20% by mass or less with respect to the entire spinning dope solution.

By using a hydrophilic polymer having relatively low molecular weight (weight-average molecular weight of 1,000 to 200,000), the pore-forming effect is enhanced, thus making it possible to improve the water permeability of the hollow fiber membrane. Meanwhile, when a hydrophilic polymer having relatively high molecular weight (weight-average molecular weight of 200,000 to 1,200,000) is used, the molecular chain is long and the interaction with the polysulfone-based polymer increases, so that the polymer easily remains in the hollow fiber membrane and contributes to an improvement in hydrophilicity of the hollow fiber membrane. Therefore, it is more preferable to use a blend of a low molecular weight hydrophilic polymer and a high molecular weight hydrophilic polymer.

The liquid (injection liquid) to be ejected through an inside tube of a double tube spinneret is a mixed solution of a good solvent and a poor solvent to a polysulfone-based polymer, and it is possible to adjust the water permeability and the molecular weight cutoff, that is, the pore diameter of the hollow fiber membrane by the ratio. There is no particular limitation on poor solvent, and water and alcohol-based solvents such as ethanol and isopropyl alcohol are used, and water is most preferably used. There is no particular limitation on good solvent, and N-methylpyrrolidone and N,N-dimethylacetamide are suitably used.

When the spinning dope solution is in contact with the injection liquid, phase separation of the spinning dope solution is induced by the action of the poor solvent and thus coagulation proceeds. When the ratio of the poor solvent in the injection liquid is excessively increased, permeability and molecular weight cutoff of the membrane deteriorate. Meanwhile, when the ratio of the poor solvent in the injection liquid is excessively decreased, the solution is dropped in a state of liquid, thus failing to obtain a hollow fiber membrane. Proper ratio of the good solvent and the poor solvent in the injection liquid varies depending on the type of both solvents, and the proportion of poor solvent is preferably 10% by mass or more and 80% by mass or less in the mixed solvent of both solvents.

The temperature of a double tube spinneret during ejecting can exert an influence on viscosity of the spinning dope solution, phase separation behavior, and rate of diffusion of the injection liquid into the spinning dope solution. Commonly, the higher the temperature of the double tube spinneret, the diffusion rate of the poor solvent is improved and phase separation proceeds, and thus water permeability and molecular weight cutoff of the resulting hollow fiber membrane increase. Too high temperature of the double tube spinneret may cause unstable ejecting due to a decrease in viscosity of the spinning dope solution and deterioration of coagulant property, leading to deterioration of spinnability. Meanwhile, low temperature of the double tube spinneret may cause deposition of water to the double tube spinneret due to dew condensation. Therefore, the temperature of the double tube spinneret is preferably 20° C. or higher and 90° C. or lower.

As mentioned above, since the separation performance depends on the minor axis diameter of pores existing on the inner surface of the hollow fiber membrane, the pore shape is made elliptical and the open porosity is increased, thus making it possible to achieve both high separation performance and high water permeability. Examples of the method of making the pores on the inner surface of the hollow fiber membrane elliptic include a stretching method in which the porous membrane is stretched after solidification, and a method in which the draft ratio is increased and the porous membrane is stretched before solidification. Of these, the method of increasing the draft ratio is preferable because it can be widely applied without being limited by the method of producing the porous membrane and the material. The draft ratio is the value obtained by dividing the take-up speed of the porous membrane by the linear ejection speed from the slit for ejecting the spinning dope solution. The linear ejection speed is the value obtained by dividing the ejection amount by the cross-section of the slit, which is the portion where the spinning dope solution of the die is ejected. Therefore, in order to increase the draft ratio, the take-up speed may be increased or the cross-section of the ejection portion of the slit may be increased. Of these, the method of increasing the cross-section of the slit is preferable because it is easy to increase the draft ratio without changing the shape of the porous membrane.

It is preferable that the spinning dope solution is ejected through a double tube spinneret and runs in an air in a predetermined interval called a dry part before entering in a coagulation bath. At the dry part, when the outer surface of the spinning dope solution is in contact with the air, moisture in the air is incorporated and serves as poor solvent, and thus phase separation proceeds. Therefore, the open porosity of the outer surface of the thus obtained hollow fiber membrane can be adjusted by controlling a dew point of the dry part. If the dew point of the dry part is low, phase separation does not sometimes sufficiently proceed and the open porosity of the outer surface may decrease, so that friction of the hollow fiber membrane increases, leading to deterioration of the spinnability. Meanwhile, even when the dew point of the dry part is too high, the outer surface may be sometimes coagulated, leading to a decrease in open porosity. The dew point of the dry part is preferably 60° C. or lower and 10° C. or higher.

When the distance of the dry part (dry part length) is too short, coagulation occurs before phase separation sufficiently proceeds, leading to deterioration of the permeability and the fractionation performance. Therefore, the dry part length is preferably 50 mm or more, and more preferably 100 mm or more. Meanwhile, when the dry part length is too long, the spinning stability may deteriorate by fiber sway, so that the dry part length is preferably 600 mm or less.

The spinning dope solution is subjected to a coagulation bath containing a poor solvent for the polysulfone-based polymer as a main component, after running through the dry part. Water is preferably used as the poor solvent for the coagulation bath. When the spinning dope solution enters into the coagulation bath, the spinning dope solution is coagulated by a large amount of the poor solvent in the coagulation bath and the membrane structure is fixed. The good solvent may be optionally added in the coagulation bath. Since coagulation is suppressed by more increasing the temperature in the coagulation bath or more increasing the concentration of the good solvent in the coagulation bath, permeability and molecular weight cutoff increase.

It is preferred for the hollow fiber membrane obtained by coagulating in the coagulation bath to be washed with water since the hollow fiber membrane contains an excess hydrophilic polymer derived from the solvent and the spinning dope solution. The washing method is preferably a method of passing a solvent with the composition in which the polysulfone-based polymer is not dissolved but the surplus hydrophilic polymer is dissolved. Examples of such solvent include an aqueous solution in which a good solvent is mixed to the extent where alcohols such as ethanol and a polysulfone-based polymer are not dissolved, or water. Of these, water is preferable from the viewpoint of the handleability. The washing temperature is preferably 50 to 100° C. since the washing efficiency can be improved by raising the temperature of the solvent used for washing.

Examples of the method for supporting a coating polymer on the surface of the porous hollow fiber membrane thus obtained include a method in which a coating polymer is added in the spinning dope solution or the injection solution during membrane formation, and a method in which a coating polymer solution is in contact with the surface after membrane formation. Of these, preferred is a method in which the coating polymer solution is in contact with the hollow fiber membrane after membrane formation since it does not exert an influence on the membrane formation conditions. Examples of such method include a method in which a hollow fiber membrane is immersed in a coating polymer solution, a method in which a coating polymer solution is passed through a hollow fiber membrane, a method in which a coating polymer solution is sprayed over a hollow fiber membrane and the like. Of these, preferred is a method in which a coating polymer solution is passed through a hollow fiber membrane since it is possible to apply a coating polymer from the inside to the outside surface of the hollow fiber membrane.

When the coating polymer solution is passed through the hollow fiber membrane, a sufficient amount of the polymer cannot be introduced onto the surface if the concentration of the polymer in the solution is too low. Therefore, the concentration of the coating polymer in the coating polymer solution is preferably 10 ppm or more, more preferably 100 ppm or more, and still more preferably 300 ppm or more. However, if the concentration is too high, the eluate from the module may increase and the pore size may change. Therefore, the concentration of the coating polymer in the aqueous solution is preferably 100,000 ppm or less, and more preferably 10,000 ppm or less.

Water is preferable as the solvent used for preparing the coating polymer solution. However, if the coating polymer used has low solubility in water, the coating polymer may be dissolved in an organic solvent which does not dissolve the hollow fiber membrane, or a mixed solvent of an organic solvent which is compatible with water and does not dissolve the hollow fiber membrane, and water. Examples of the organic solvent which can be used as the above organic solvent or mixed solvent include, but are not limited to, alcohol-based solvents such as methanol, ethanol or propanol.

The coating polymer solution may be passed through the hollow fiber membrane from either the inside to the outside or the outside to the inside of the hollow fiber membrane. However, if the size of the coating polymer used is larger than the pore diameter of the inner surface of the hollow fiber membrane, the coating polymer will not pass through the pores when it is passed from the inside and is concentrated on the inner surface side, thus failing to support the coating polymer on the inside or the outer surface of the hollow fiber membrane. In such a case, the coating polymer can be supported on the entire hollow fiber membrane by allowing to separately flow the coating polymer solution outside the hollow fiber membrane. The molecular weight cutoff of the hollow fiber membrane is measured based on the measurement results of "(11) Measurement of Molecular Weight Cutoff Using Dextran" mentioned later. Based on the results, it is possible to set the molecular weight of the coating polymer so that the size of the coating polymer becomes smaller than the pore diameter of the inner surface of the hollow fiber membrane.

As mentioned above, the coating polymer is preferably immobilized on the hollow fiber membrane by a chemical bond. Examples of the method for immobilizing the coating polymer by a chemical bond include, but are not limited to, a method in which a coating polymer is in contact with a hollow fiber membrane, followed by irradiation with radiation, and a method in which a reactive group such as an amino group or a carboxyl group is introduced into both a coating polymer and the surface of a hollow fiber membrane to be immobilized, followed by the reaction of both.

Examples of the method in which a reactive group is introduced into the surface of the hollow fiber membrane include a method in which a monomer having a reactive group is polymerized to obtain a substrate having a reactive group on the surface, a method in which a reactive group is introduced by an ozone treatment or a plasma treatment after polymerization.

When using the method of irradiating with radiation, it is possible to use α-ray, β-ray, γ-ray, X-ray, ultraviolet ray, electron beam and the like as the radiation. Irradiation with radiation is performed in a state where a solution containing a coating polymer dissolved therein is in contact with a hollow fiber membrane in a hollow fiber membrane module, or in a state where a solution in a hollow fiber membrane module is removed after introducing a coating polymer on the surface of a hollow fiber membrane, or in a state where a hollow fiber membrane is dried. When this method is used, sterilization of the hollow fiber membrane module can be achieved simultaneously with immobilization of the coating polymer, which is preferable. In that case, the irradiation dose of radiation is preferably 15 kGy or more, and more preferably 25 kGy or more. Meanwhile, when the irradiation dose is too high, deterioration and decomposition of the polymer are promoted, so that the irradiation dose is preferably 100 kGy or less.

An antioxidant may be used in order to suppress the crosslinking reaction of the coating polymer due to irradiation with radiation. The antioxidant means a substance having a property of easily giving electrons to other molecules. Examples thereof include, but are not limited to, water-soluble vitamins such as vitamin C, polyphenols, and alcohol-based solvents such as methanol, ethanol or propanol. These antioxidants may be used alone, or in combination of two or more thereof. When it is necessary to consider safety, antioxidants with low toxicity such as ethanol and propanol are preferably used.

Figure 6:
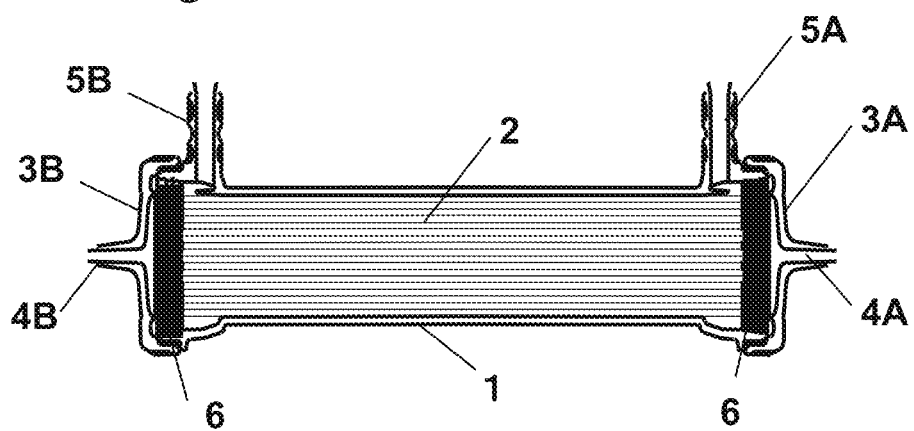
FIG. 6 is an example of a preferred embodiment of a hollow fiber membrane module.

The hollow fiber membrane module of the present invention includes the hollow fiber membrane of the present invention built in a housing. As a preferable form, as shown in FIG. 6, it is preferable that a bundle of hollow fiber membranes 2 cut into a required length is housed in a cylindrical housing 1. At this time, it is preferable that both ends of the hollow fiber membrane are fixed to both ends of the cylindrical housing 1 by a potting material 6, etc. At this time, it is preferable that both ends of the hollow fiber membrane are open. The hollow fiber membrane module preferably includes headers 3A and 3B at both ends of the housing 1. The headers 3A and 3B preferably include liquid inlets 4A and 4B, respectively. As shown in FIG. 6, the hollow fiber membrane module preferably includes nozzles 5A and 5B on the side of the housing.

The liquid to be treated is introduced from the inlet 4A or 4B and permeates from the inner surface side of the hollow fiber membrane to the outer surface side thereof, and then discharged from the nozzle 5A or 5B. At this time, the liquid to be treated may flow from both sides of the inlets 4A and 4B, or may flow from only one side. The liquid to be treated may be introduced from the nozzle 5A or 5B and permeated from the outer surface side of the hollow fiber membrane to the inner surface side thereof, and then discharged from the inlet 4A or 4B. At this time, the liquid to be treated may flow from both sides of the nozzles 5A and 5B, or may flow from only one side.

Figure 7:
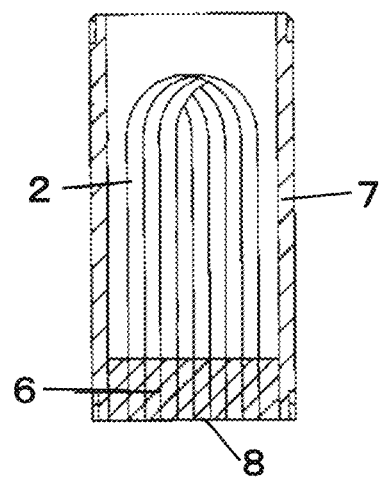
FIG. 7 is an example of a preferred embodiment of a hollow fiber membrane module.

As another preferable form of the hollow fiber membrane module, as shown in FIG. 7, a U-shaped hollow fiber membrane 2 may be built in a cylindrical housing 7. At this time, the end of the hollow fiber membrane is fixed to one side of the cylindrical housing by the potting material 6. The liquid to be treated may flow through the hollow fiber membrane opening 8 as an inlet or an outlet.

Examples of the method of modularizing the hollow fiber membrane of the present invention include a method in which a hollow fiber membrane is fixed to a housing while centrifuging, a method in which a hollow fiber membrane is formed into a U-shape and only the opening side of the hollow fiber membrane is fixed to a housing. A non-limiting example thereof is shown below. First, the hollow fiber membrane is cut into the desired length, and a desired number of the cut pieces are bundled and then placed in a cylindrical housing. Thereafter, both ends are temporarily capped, and a potting material is added to both ends of the hollow fiber membrane. At this time, adding a potting material while rotating the module by means of a centrifugal machine is preferred, because the potting material can be uniformly charged. After the potting material is solidified, both ends are cut in such a manner that openings can be formed at both ends of the hollow fiber membrane. A port through which a liquid to be treated inflows (header) is attached to both sides of the housing, and then the nozzle of the header and the housing is plugged to obtain a hollow fiber membrane module.

EXAMPLES (1) Fabrication of Hollow Fiber Membrane Module

Twenty hollow fiber membranes were filled into a housing having a diameter of about 5 mm and a length of about 17 cm, and both ends of the hollow fiber membrane were potted to each other using an epoxy resin-based chemical reaction-type adhesive agent "QUICK MENDER" (trade name) (manufactured by Konishi Co., Ltd.), and the bonded product was cut to open, thereby producing a hollow fiber membrane module.

(2) Measurement of Water Permeability

With respect to the hollow fiber membrane module prepared in (1), a hollow fiber membrane was coated with a copolymer as mentioned in each of Examples and Comparative Examples. The water permeability of the hollow fiber membrane module after the coating treatment was evaluated. Subsequently, the inside and the outside of the hollow fiber membrane in the hollow fiber membrane module were washed with distilled water for 30 minutes. A water pressure of 16 kPa was applied onto the inside of the hollow fiber membrane, and the filtration amount of water flowing out to the outside of the hollow fiber membrane per unit time was measured. The water permeability (UFR) was calculated by the following formula, and the value rounded off the first decimal place was used. At this time, the length of the portion of the hollow fiber membrane filled in the housing to which the adhesive was not adhered was measured and used for calculating the membrane area.

$$UFR(L/hr/kPa/m^2) = Qw/(P \times T \times A)$$

where Qw represents a filtration amount (L), T represents an outflow time (hr), P represents a pressure (Pa), and A represents a membrane area (m$^2$).

(3) Measurement of Virus Removal Performance

The evaluation was performed using the module which had been subjected to the evaluation (2). A virus stock solution was prepared in such a manner that cells of bacteriophage MS2 (Bacteriophage MS-2 ATCC 15597-B1) each having a size of about 27 nm were added to distilled water or phosphate buffer so that the solution would have a concentration of about $1.0 \times 10^6$ PFU/ml. Distilled water or phosphate buffer to be used was prepared by sterilized with steam under high pressure at 121° C. for 20 minutes. Using the dead end filtration method, the virus stock solution was filtrated by supplying the virus stock solution from the inner surface of the hollow fiber membrane to the outer surface thereof, or from the outer surface of the hollow fiber membrane to the inner surface thereof under the conditions of a temperature of about 20° C. under a pressure of 50 kPa to obtain a filtrate. After 10 ml of a permeated liquid immediately after initiation of filtration was discarded and 10 ml of a permeated liquid for measurement was collected. The concentration of bacteriophage MS2 was determined in accordance with the method of Overlay agar assay, Standard Method 9211-D (APHA, 1998, Standard methods for the examination of water and wastewater, 18th ed.) by seeding 1 ml of each of the permeated liquids diluted with distilled water as necessary onto an assay petri dish and then counting the number of plaques. Plaques are masses of bacteria which have been infected with viruses and died, and can be counted as dot-like plaques. The virus removal performance was expressed in terms of a log reduction value (LRV) for viruses. For example, LRV2 is $-\log 10x=2$, i.e., 0.01, and means that the concentration of viruses in the permeated liquid to the concentration of viruses in the virus stock solution is 1/100 (removal rate: 99%). When no plaque was counted in a permeated liquid, it means that the permeated liquid has an LRV of less than 6.0.

(4) Measurement of Pore Diameter of Surface

A hollow fiber membrane was wetted by immersing in water for 5 minutes and then frozen with liquid nitrogen, and the freeze-dried hollow fiber membrane was used as a measurement sample. The hollow fiber membrane was cut into a semi-cylindrical shape so that the inner surface was exposed. The inner surface of the hollow fiber membrane was observed using a scanning electron microscope (SEM) (S-5500, manufactured by Hitachi High-Technologies Corporation) at a magnification of 50,000 times, and an image thereof was captured in a computer. The size of the captured image was 640 pixels×480 pixels. For pores in a range of 1 µm×1 µm on the inner surface of the hollow fiber membrane, image processing software (ImageJ, developed by the National Institute of Health, USA) was used to fit each pore into an elliptical shape, and the minor axis diameter and the major axis diameter of the pores were measured. Data was added by repeating measurement in a range of 1 μm×1 μm until the total number of measured pores was 50 or more. When the pores were double observed in the depth direction, the exposed portion of the deeper pore was measured. If a part of the pore was out of the measurement range, the pore was excluded. The SEM image was binarized to obtain an image in which the void was seen as black and the structural part was seen as white. If the voids and structural parts cannot be binarized cleanly due to the contrast difference in the analysis image, the voids were colored in black and then image processing was performed to fit the pores into an elliptical shape. The minor axis diameter and the major axis diameter of each pore were measured, and an average of the minor axis diameter was calculated. The pore diameter was the value rounded off the second decimal place. At this time, in order to cut noise, pores having an area where the number of consecutive pixels was 5 pixels or less were excluded from the data. The ratio of the major axis diameter to the minor axis diameter was calculated from the average of each pore, and the value obtained by rounding off the second decimal place was used.

With respect to the surface pore diameter of the outer surface of the hollow fiber membrane, observation was performed at a magnification of 1,500 times in the same manner as mentioned above, an image thereof was captured in a computer, and the minor axis diameter and the major axis diameter of the pores in a range of 50 μm×50 μm were similarly measured.

(5) Measurement of Open Porosity

As with (4), the surface of a sample was observed using a scanning electron microscope (SEM) (S-5500, manufactured by Hitachi High-Technologies Corporation) at a magnification of 50,000 times, and an image thereof was captured in a computer. The size of the captured image was 640 pixels×480 pixels. The SEM image was cut into a 1 μm×1 μm piece and the image analysis of the piece was performed using image processing software. A threshold value was determined by binary coded processing in such a manner that a structural part had a light brightness value and the parts other than the structural part had a dark brightness value, thereby obtaining an image in which the light brightness region was seen as white and the dark brightness region was seen as black. When the structural part could not be distinguished from the parts other than the structural part due to the contrast difference in the image, areas in which the contrasts were same as each other were cut out, the areas were separately subjected to binary coded processing, and then the cut areas were put back together to form a single image. Alternatively, the parts other than the structural part may be colored in black, followed by image analysis. The image contained noises, and the dark brightness region in which the number of contiguous pixels was 5 or less was regarded as the light brightness region, i.e., the structural part, because the noises and pores could not be distinguished from each other. As the method for eliminating the noises, the dark brightness region in which the number of contiguous pixels was 5 or less was excluded in the counting of the number of pixels. Alternatively, the noise part may be colored in white. An open porosity was determined by calculating the percentage of the number of the pixels in the dark brightness region relative to the total number of pixels forming the analyzed image. The measurement was performed on 5 images and an average value thereof was calculated and the value rounded off the second decimal place was used.

With respect to the surface pore diameter of the outer surface of the hollow fiber membrane, observation was performed at a magnification of 1,500 times in the same manner as above, data was captured in a computer and the open porosity was similarly calculated in a range of 50 μm×50 μm.

(6) Measurement of Thickness of Dense Layer

A hollow fiber membrane was wetted by immersing in water for 5 minutes, frozen with liquid nitrogen, quickly folded, and the freeze-dried hollow fiber membrane thus obtained was used as a sample for observation. The cross-section of the porous membrane was observed with a SEM (S-5500, manufactured by Hitachi High-Technologies Corporation) at a magnification of 10,000 times, and an image thereof was captured in a computer. The size of the captured image was 640 pixels×480 pixels. In the case where pores present in the cross section were closed when observed with the SEM, the preparation of a sample was retried. The closing of the pores may sometimes occur due to the deformation of the porous membrane in the stress direction in the cutting treatment.

The SEM image was cut in a direction parallel to the surface of the porous membrane at a length of 1 μm and in the thickness direction at an arbitrary length, and the image of the resultant area was analyzed using image processing software. The length of the area to be analyzed in the membrane direction may be any length as long as a dense layer fits. When a dense layer did not fit within the observation field at a measurement magnification, at least two SEM images were synthesized so as to fit the dense layer within the SEM images. A threshold value was determined by binary coded processing in such a manner that a structural part had a light brightness value and the parts other than the structural part had a dark brightness value, thereby obtaining an image in which the light brightness region was seen as white and the dark brightness region was seen as black. When the structural part could not be distinguished from the parts other than the structural part due to the contrast difference in the image, areas in which the contrasts were same as each other were cut out, the areas were separately subjected to binary coded processing, and then the cut areas were put back together to form a single image. Alternatively, the parts other than the structural part may be colored in black, followed by image analysis. When two overlapping pores were observed in the depth direction, a pore located at a shallower position was measured. When a portion of a pore was out of the measurement area, the pore was excluded. The image contained noises, and the dark brightness region in which the number of contiguous pixels was 5 or less was regarded as the light brightness region, i.e., the structural part, because the noises and pores could not be distinguished from each other. As the method for eliminating the noises, the dark brightness region in which the number of contiguous pixels was 5 or less was excluded in the counting of the number of pixels. Alternatively, the noise part may be colored in white. The number of pixels in a scale bar which indicated a known length in the image was counted, and the length per pixel was calculated. The number of pixels in the pores was counted, and the result was multiplied by the square of the length per pixel to determine the pore area. The diameter of a circle corresponding to the pore area was calculated in accordance with the following equation to determine the pore diameter. The pore area corresponding to the pore diameter of 130 nm was $1.3 \times 10^4$ (nm$^2$).

$$\text{Pore diameter} = (\text{pore area}/\text{circular constant})^{1/2} \times 2$$

Pores each having a pore diameter of more than 130 nm were identified and the layer in which these pores are not observed was defined as a dense layer, and the thickness of the dense layer was measured in the direction vertically from the inner surface of the hollow fiber membrane. A perpendicular line was drawn on the surface, and the shortest distance (i.e., the distance between the surface and the closest pore having a pore diameter of 130 nm or more) among the distances between the surface on the perpendicular line and pores each having a pore diameter of 130 nm or more was determined. In the same image, the measurement was carried out at 5 positions. With respect to 5 images, the measurement was carried out in the same manner, and an average of 25 measurement data was calculated. The value rounded off the third decimal place was regarded as the thickness of the dense layer.

(7) Measurement of TOF-SIMS

A hollow fiber membrane was sliced into a semi-cylindrical shape using a single-edged knife, and three points were measured at different points on the inner or outer surface of the hollow fiber membrane. The measurement sample was rinsed with ultrapure water, dried at room temperature under 0.5 Torr for 10 hours, and then subjected to the measurement. The measurement device and conditions are as follows.

Measurement device: TOF. SIMSS (manufactured by ION-TOF)
    Primary ion: $Bi_3^{++}$
    Primary ion acceleration voltage: 30 kV
    Pulse width: 5.9 ns
    Secondary ion polarity: negative
    Number of scans: 64 scan/cycle
    Cycle time: 140 μs
    Range of measurement: 200×200 μm$^2$
    Range of mass (m/z): 0 to 1,500

The presence or absence of carboxylic acid ions on the surface of the hollow fiber membrane was confirmed from the obtained mass m/z spectrum. However, when the carboxylic acid ionic strength with respect to the total secondary ionic strength is 0.4% or less, it is determined to be noise and no carboxylic acid is present.

(8) Measurement by X-Ray Photoelectron Spectroscopy (XPS)

A hollow fiber membrane was sliced into a semi-cylindrical shape using a single-edged knife, and two points were measured at different points on the inner or outer surface of the hollow fiber membrane. The measurement sample was rinsed with ultrapure water, dried at room temperature under 0.5 Torr for 10 hours, and then subjected to the measurement. The following measurement device and conditions are as follows.

Measurement device: ESCA LAB220iXL (manufactured by VG)
    Excitation X-ray: monochromatic Al Kα1, 2 radiation (1486.6 eV)
    X-ray diameter: 0.15 mm
    Photoelectron escape angle: 90° (tilt of detector relative to sample surface)

C1s peaks are composed of five components: a component mainly derived from CHx, C—C, C=C and C—S; a component mainly derived from C—O and C—N; a component derived from Π-Π* satellite; a component derived from C=O; and a component derived from COO. Therefore, the peaks are deconvoluted into the five components. The COO-derived component corresponds to the peak observed at +4.0 to +4.2 eV from the main CHx or C—C peak (at about 285 eV). The peak area ratio of each component was rounded off the second decimal place, and the area percentage of the carbon peak derived from the ester group was calculated when the total peak area derived from carbon was 100 (% by atom). As a result of peak deconvolution, the peak area percentage of 0.4% or less was determined to be the detection limit or less.

(9) Microscopic ATR Method

A hollow fiber membrane was sliced into a semi-cylindrical shape with a single-edged knife, rinsed with ultrapure water, and then dried at room temperature under 0.5 Torr for 10 hours to obtain a sample for the measurement of a surface. Each surface of the dried hollow fiber membrane was measured by a microscope ATR method using IRT-3000 manufactured by JASCO Corporation. The measurement was performed in a field region (aperture) of 100 μm×100 μm in a measurement range of 3 μm×3 μm with a cumulative number of 30, and 5 points (lengthwise) by 5 points (widthwise) (25 points in total) were measured. A base line was drawn on the resulting spectrum in the wavelength range of 1,549 to 1,620 cm$^{-1}$, and the peak area surrounded by the base line and the positive part of the spectrum was determined to be a peak area ($A_{CC}$) derived from the benzene ring C=C of polysulfone. In the same manner, a base line was drawn on the spectrum in the range of 1,711 to 1,759 cm$^{-1}$, and the peak area surrounded by the base line and the positive part of the spectrum was determined to be a peak area ($A_{COO}$) derived from an ester group. According to the above operation, three different positions of the same hollow fiber were measured and an average of ($A_{COO}$)/($A_{CC}$) was calculated. Furthermore, the same measurement was performed with three different hollow fibers, and the average of ($A_{COO}$)/($A_{CC}$) was calculated from the average of ($A_{COO}$)/($A_{CC}$) of each hollow fiber membrane, and the value rounded off the third decimal place was used.

(10) Antibody Recovery Test

A Tris-buffer solution containing 2.0 g/L of IgG (human serum-derived, Oriental Yeast Co., Ltd.) was prepared and used as a stock solution. Regarding the hollow fiber membrane module prepared in the above (1) and coated with a copolymer as mentioned in each of Examples and Comparative Examples, 10 mL of the stock solution was allowed to flow to the direction from the inner surface to the outer surface of the hollow fiber, or to the direction from the outer surface to the inner surface of the hollow fiber membrane under a pressure of 50 kPa, and then the filtrate was collected and the liquid amount was measured. Thereafter, 5 mL of the Tris-buffer solution was allowed to flow to the hollow fiber membrane module in the direction from the inner surface to the outer surface of the hollow fiber, or to the direction from the outer surface to the inner surface of the hollow fiber membrane under a pressure of 50 kPa, and then the filtrate was collected and the liquid amount was measured. The IgG recovery rate (antibody recovery rate) was calculated by (total weight of IgG contained in filtrate and wash solution)/(weight of IgG contained in stock solution)×100%. The weight of IgG was calculated by measuring the IgG concentration using an ELISA kit (Funakoshi) and multiplying the IgG concentration by the liquid volume. The value rounded off the second decimal place was used.

(11) Measurement of Molecular Weight Cutoff Using Dextran

The hollow fiber membrane module fabricated in (1) was used for measurement after washing the inside and outside of the hollow fiber membrane with distilled water for 30 minutes. Each of dextran manufactured by SIGMA-Aldrich (product number: No. 31394, No. 31388, No. 31387, No. 31389, No. 31397, No. 31398 and No. 95771) and Dextran T500 manufactured by PHARMACOSMOS was dissolved in distilled water so that the concentration became 0.5 mg/mL (4.0 mg/mL for the entire solute) to prepare an aqueous dextran solution (stock solution).

The stock solution was allowed to flow inside the hollow fiber membrane and then filtered outside the hollow fiber membrane. The temperature of the stock solution was set at 37° C. and the flow rate was adjusted so that the stock solution flow rate became 1.8 mL/min and the filtration flow rate became 0.36 mL/min. At 15 minutes to 23 minutes after passing the stock solution, the stock solution at the inlet, the stock solution at the outlet, and the filtered liquid of the hollow fiber membrane module were respectively collected and filtered through a filter having a pore diameter of 0.45 μm. Using the filtrate as a measurement sample, the concentration of dextran was measured by GPC. Using a column for GPC (Tosoh TSK-gel-GMPW$_{XL}$) as GPC at the column temperature of 40° C., distilled water for liquid chromatography as a mobile phase and a GPC system (HLC-8220GPC, manufactured by Tosoh Corporation), analysis was performed at a sample flow rate of 1 mL, a reference flow rate of 0.5 mL/min and a sample injection amount of 100 μL. A differential refractive index measurement was used as the detector. Before the measurement of the sample, using dextran of monodisperse (dextran standard No. 31416, No. 31417, No. 31418, No. 31420, No. 31422, No. 31424, No. 49297, manufactured by SIGMA-Aldrich), a calibration curve for the weight-average molecular weight of dextran was obtained. The above measurement was performed using this calibration curve, and a distribution curve of the dextran weight-average molecular weight and the dextran concentration was obtained for each of the stock solution at the inlet, the stock solution at the outlet and the filtered solution. The sieving coefficient (SC) at a certain weight-average molecular weight was calculated from the dextran concentration of the stock solution at the inlet (Ci), the dextran concentration of the stock solution at the outlet (Co), and the dextran concentration of the filtrate (Cf) by the following formula.

$$SC=2Cf/(Ci+Co)$$

The weight-average molecular weight at which SC became 0.5 was taken as the molecular weight cutoff, and the hundreds and lower digits were truncated.

(12) Measurement of Antibody Permeability Maintenance Rate

A phosphate buffer solution containing 2.0 g/L of IgG (human serum-derived, Oriental Yeast Co., Ltd.) was prepared and used as a stock solution. With respect to the hollow fiber membrane module prepared in the above (1) and coated with a copolymer as mentioned in each of Examples and Comparative Examples, 30 mL of the stock solution was allowed to flow to the direction from the inner surface to the outer surface of the hollow fiber, or to the direction from the outer surface to the inner surface of the hollow fiber membrane under a pressure of 50 kPa. At this time, 5 mL each of the filtrate was sampled, and the absorbance of light having a wavelength of 280 nm was measured by UV-visible spectroscopy in the antibody stock solution, the first 0 to 5 mL of the filtrate, and the last 25 to 30 mL of the filtrate. The maintenance rate of the antibody permeability was calculated by the following formula, providing that the absorbance of the antibody stock solution is Abs (stock solution), the absorbance of the first 0 to 5 mL filtrate is Abs (5 mL) and the absorbance of the last 25 to 30 mL filtrate is Abs (30 mL).

Antibody permeability maintenance rate(%)=[Abs(30 mL)/Abs(stock solution)]/[Abs(5 mL)/Abs(stock solution)]×100.

(13) Measurement of Number-Average Molecular Weight of Polymer

A 0.1N LiNO$_3$ solution of water/methanol=50/50 (volume ratio) was prepared and used as a GPC developing solution. 2 mg of the copolymer was dissolved in 2 ml of this solution. 100 μL of this copolymer solution was injected into a GPC to which a column (Tosoh GMPW$_{XL}$) was connected, and measurement was performed at a flow rate of 0.5 mL/min. The measurement time was 30 minutes. The detection was performed by a differential refractive index (RI) detector, and the number-average molecular weight was calculated from the peak derived from the copolymer which appeared at an elution time of around 15 minutes. The number-average molecular weight was calculated by rounding off the hundreds place. For obtaining the calibration curve, a polyethylene oxide standard sample (0.1 kD to 1258 kD) manufactured by Agilent was used.

Example 1

18 Parts by weight of polysulfone (Udel (registered trademark) P-3500, manufactured by Solvay Corp.), 6 parts by weight of polyvinylpyrrolidone (Povidone (PL-ASDONE) K29/K32, manufactured by ASHLAND LCC) and 3 parts by weight of polyvinylpyrrolidone (Povidone (PLASDONE) K90, manufactured by ASHLAND LCC) were added to a solvent composed of 72 parts by weight of N,N-dimethylacetamide and 1 part by weight of water, and then dissolved by heating at 90° C. for 14 hours to obtain a spinning dope solution. This spinning dope solution was ejected from an orifice type double tube spinneret adjusted to 40° C., and at the same time, a liquid containing 72% by weight of N,N-dimethylacetamide and 28% by weight of water as an injection liquid was ejected from an inner tube. The ejected spinning dope solution was passed through a dry type space having a length of 350 mm, and then introduced into a coagulation bath at 50° C. containing water to obtain a hollow fiber membrane. The hollow fiber membrane thus obtained had an inner diameter of 281 μm and a membrane thickness of 52 μm, and had an asymmetric structure in which the inner surface side of the hollow fiber membrane was dense and the outer surface side was coarse. A hollow fiber membrane module was fabricated by the method (1), and the dextran fractionated molecular weight was measured by the method (11). Based on the results, a vinylpyrrolidone/vinyl propanoate random copolymer having a size smaller than the pore diameter of the inner surface of the hollow fiber membrane (molar fraction of vinyl propanoate unit of 40%, number-average molecular weight of 16,500) was selected. An aqueous solution prepared by dissolving the copolymer at the concentration of 50 ppm and ethanol at the concentration of 200 ppm was passed from the inside to the outside of the hollow fiber membrane to coat the entire membrane. Subsequently, a hollow fiber membrane module 1 was obtained by irradiating with 25 kGy γ-ray.

Example 2

The same operation as in Example 1 was performed, except that the concentration of the vinylpyrrolidone/vinyl propanoate random copolymer (vinyl propanoate unit molar fraction of 40%, number-average molecular weight of 16,500) was 200 ppm, to obtain a hollow fiber membrane module 2.

Example 3

The same operation as in Example 1 was performed, except that the polymer used in the coating solution was a vinylpyrrolidone/vinyl acetate random copolymer ("KOLLIDON" (registered trademark) VA64 manufactured by BASF Corporation), to obtain a hollow fiber membrane module 3.

Example 4

The same operation as in Example 1 was performed, except that the spinning dope solution was ejected from an orifice type double tube spinneret adjusted to 45° C., to obtain a hollow fiber membrane. The hollow fiber membrane thus obtained had an inner diameter of 278 μm and a membrane thickness of 50 μm, and had an asymmetric structure in which the inner surface side of the hollow fiber membrane was dense and the outer surface side was coarse. A hollow fiber membrane module 4 was obtained by the same operation as in Example 1.

Comparative Example 1

The same operation as in Example 1 was performed, except that an aqueous solution of a vinylpyrrolidone/vinyl propanoate random copolymer (vinyl propanoate unit molar fraction of 40%, number-average molecular weight of 16,500) was not passed, to obtain a hollow fiber membrane module 5.

Comparative Example 2

The same operation as in Example 1 was performed, except that a solution containing 63% by weight of N,N-dimethylacetamide and 37% by weight of water was used as the injection liquid, to obtain a hollow fiber membrane. The hollow fiber membrane thus obtained had an inner diameter of 201 μm and a membrane thickness of 41 μm, and had an asymmetric structure in which the inner surface side of the hollow fiber membrane was dense and the outer surface side was coarse. A hollow fiber membrane module 6 was obtained by the same operation as in Example 1.

Comparative Example 3

The same operation as in Example 1 was performed, except that a solution containing 74% by weight of N,N-dimethylacetamide and 26% by weight of water was used as the injection liquid, and the temperature of the coagulation bath was set at 60° C., to obtain a hollow fiber membrane. The hollow fiber membrane thus obtained had an inner diameter of 283 μm and a membrane thickness of 48 μm, and had an asymmetric structure in which the inner surface side of the hollow fiber membrane was dense and the outer surface side was coarse. A hollow fiber membrane module 7 was obtained by the same operation as in Example 1.

Example 5

20 Parts by weight of polysulfone (Udel (registered trademark) P-3500, manufactured by Solvay Corp.), 6 parts by weight of polyvinylpyrrolidone (Povidone (PLASDONE) K29/K32, manufactured by ASHLAND LCC) and 3 parts by weight of polyvinylpyrrolidone (Povidone (PLASDONE) K90, manufactured by ASHLAND LCC) were added to a solvent composed of 72 parts by weight of N,N-dimethylacetamide and 1 part by weight of water, and then dissolved by heating at 90° C. for 14 hours to obtain a spinning dope solution. This spinning dope solution was ejected from an orifice type double tube spinneret adjusted to 40° C., and at the same time, a solution containing 72% by weight of N,N-dimethylacetamide and 28% by weight of water as an injection liquid was ejected from an inner tube. The ejected spinning dope solution was passed through a dry type space having a length of 350 mm and then introduced into a coagulation bath at 40° C. containing water to obtain a hollow fiber membrane. The hollow fiber membrane thus obtained had an inner diameter of 276 μm and a membrane thickness of 52 μm, and had an asymmetric structure in which the inner surface side of the hollow fiber membrane was dense and the outer surface side was coarse. A hollow fiber membrane module was produced by the method (1), and the dextran molecular weight cutoff was measured by the method (11). Based on the results, a vinylpyrrolidone/vinyl propanoate random copolymer having a size smaller than the pore diameter of the inner surface of the hollow fiber membrane (vinyl propanoate unit molar fraction of 40%, number-average molecular weight of 16,500) was selected. An aqueous solution prepared by dissolving the copolymer at the concentration of 200 ppm and ethanol at the concentration of 1,000 ppm was passed from the inside to the outside of the hollow fiber membrane to coat the entire membrane. Subsequently, a hollow fiber membrane module 8 was obtained by irradiating with 25 kGy γ-ray.

Tables 1 and 2 show the configurations and various evaluation results of the hollow fiber membrane modules obtained in Examples and Comparative Examples.

TABLE 1

| | Hollow fiber membrane | | | | | | | |
|---|---|---|---|---|---|---|---|---|
| | Inner surface | | | Outer surface | | | | |
| | Average of minor axis diameter of pores (nm) | Major axis diameter/minor axis diameter | Open porosity (%) | Average of minor axis diameter of pores (μm) | Major axis diameter/minor axis diameter | Open porosity (%) | Thickness of dense layer (μm) | Molecular weight cutoff of dextran |
| Example 1 | 28.7 | 2.7 | 19.9 | 0.5 | 2.0 | 7.5 | 0.18 | 148,000 |
| Example 2 | 28.4 | 2.7 | 19.5 | 0.6 | 2.0 | 7.9 | 0.19 | 148,000 |
| Example 3 | 28.3 | 2.7 | 20.2 | 0.5 | 2.0 | 7.8 | 0.17 | 148,000 |
| Example 4 | 34.2 | 2.9 | 28.8 | 0.5 | 1.9 | 7.3 | 0.18 | 201,000 |

TABLE 1-continued

Hollow fiber membrane

| | Inner surface | | | Outer surface | | | | |
| --- | --- | --- | --- | --- | --- | --- | --- | --- |
| | Average of minor axis diameter of pores (nm) | Major axis diameter/minor axis diameter | Open porosity (%) | Average of minor axis diameter of pores (μm) | Major axis diameter/minor axis diameter | Open porosity (%) | Thickness of dense layer (μm) | Molecular weight cutoff of dextran |
| Example 5 | 27.4 | 3.1 | 5.8 | 0.5 | 1.8 | 6.3 | 0.34 | 227,000 |
| Comparative Example 1 | 28.7 | 2.7 | 19.9 | 0.5 | 2.0 | 7.5 | 0.18 | 148,000 |
| Comparative Example 2 | 10.9 | 2.9 | 6.4 | 0.3 | 2.8 | 8.3 | 0.5 | 41,000 |
| Comparative Example 3 | 40.5 | 2.6 | 31.9 | 0.6 | 2.1 | 8.1 | 0.21 | 325,000 |

TABLE 2

| | Coating polymer | | | Evaluation of performance | | | | | |
| --- | --- | --- | --- | --- | --- | --- | --- | --- | --- |
| | Structure | Monocarboxylic acid ions*1 | Peak area derived from an ester group*2 (%) | Inner surface ATR $(A_{COO})/(A_{CC})$ | Outer surface ATR $(A_{COO})/(A_{CC})$ | Water permeability (UFR)L/ (hr · kPa · m²) | Virus removal performance (LRV) | Antibody recovery rate (%) | Antibody permeability maintenance rate (%) |
| Example 1 | Vinylpyrrolidone/ vinyl propanoate random copolymer | Propanoic acid ions | 0.7 | 0.21 | 0.15 | 13.8 | >6.0 | 95.2 | 90.7 |
| Example 2 | Vinylpyrrolidone/ vinyl propanoate random copolymer | Propanoic acid ions | 1 | 0.32 | 0.22 | 10 | >6.0 | 97.3 | 98.1 |
| Example 3 | Vinylpyrrolidone/ vinyl acetate random copolymer | Acetic acid ions | 0.8 | 0.15 | 0.07 | 15.8 | >6.0 | 89.2 | 84.6 |
| Example 4 | Vinylpyrrolidone/ vinyl propanoate random copolymer | Propanoic acid ions | 0.7 | 0.26 | 0.18 | 15.2 | 5.1 | 94.5 | 91.2 |
| Example 5 | Vinylpyrrolidone/ vinyl propanoate random copolymer | Propanoic acid ions | 1.2 | 0.31 | 0.24 | 1.33 | >6.0 | 95.9 | 98.6 |
| Comparative Example 1 | — | None | — | nd | nd | 27.9 | >6.0 | 79.3 | 75.4 |
| Comparative Example 2 | Vinylpyrrolidone/ vinyl propanoate random copolymer | Propanoic acid ions | 0.7 | 0.11 | nd | 8.7 | >6.0 | 21.5 | — |
| Comparative Example 3 | Vinylpyrrolidone/ vinyl propanoate random copolymer | Propanoic acid ions | 0.8 | 0.27 | 0.19 | 31.1 | 1.8 | 93.4 | 91.3 |

*1Type of monocarboxylic acid ions specified by the measurement of TOF-SIMS
*2Ratio of the peak area derived from an ester group to the total peak area derived from carbon measured by XPS
nd: not detected

REFERENCE SIGNS LIST

A: Outer surface side
B: Inner surface side
1: Cylindrical housing
2: Hollow fiber membrane
3A: Header
3B: Header
4A: Inlet
4B: Inlet
5A: Nozzle
5B: Nozzle
6: Potting material
7: Cylindrical housing
8: Openings of hollow fiber membrane

The invention claimed is:

1. A porous hollow fiber membrane containing a polysulfone-based polymer as a main component, which has an asymmetric structure in which the membrane has an inner surface side that is dense and has an outer surface side that is coarse, wherein
an average of a minor axis diameter of pores of the membrane inner surface is 20 nm or more and 40 nm or less,
the membrane inner surface has an open porosity of 5% or more and 30% or less,
the membrane outer surface, the membrane inner surface and an interior of the membrane all support a coating of a polymer including a monocarboxylic acid vinyl ester unit, and
an average of a ratio $(A_{COO})/(A_{CC})$ of a peak area $(A_{COO})$ of an infrared absorption spectrum derived from an ester group to a peak area ($A_{CC}$) of an infrared absorption spectrum derived from a benzene ring of the polysulfone-based polymer is 0.01 or more and 1 or less for the each of the inner surface and the outer surface, when the measurement is performed on surface of the outer surface and the inner surface of the porous hollow fiber membrane by infrared microspectroscopy.

2. The porous hollow fiber membrane according to claim 1, wherein the membrane inner surface side includes a dense layer with no pores having a pore diameter of 130 nm or more and the dense layer has a thickness of 1 μm or less.

3. The porous hollow fiber membrane according to claim 1, wherein a ratio of a major axis diameter to a minor axis diameter of pores of the inner surface is 2 or more and 6 or less.

4. The porous hollow fiber membrane according to claim 1, wherein a thickness of the porous hollow fiber membrane is 20 μm or more and 100 μm or less.

5. The porous hollow fiber membrane according to claim 1, wherein the monocarboxylic acid vinyl ester unit is a unit represented by "—CH(OCO—R)—CH$_2$—", wherein R is an aliphatic hydrocarbon group or an aromatic hydrocarbon group.

6. The porous hollow fiber membrane according to claim 5, wherein R is an aliphatic hydrocarbon group having 1 to 20 carbon atoms.

7. The porous hollow fiber membrane according to claim 6, wherein the monocarboxylic acid vinyl ester unit is selected from the group consisting of a vinyl acetate unit, a vinyl propanoate unit, a vinyl butyrate unit, a vinyl pentanoate unit, a vinyl pivalate unit and a vinyl hexanoate unit.

8. The porous hollow fiber membrane according to claim 1, wherein the polymer including a monocarboxylic acid vinyl ester unit is a copolymer composed of a hydrophobic unit including a monocarboxylic acid vinyl ester unit, and a hydrophilic unit.

9. The porous hollow fiber membrane according to claim 8, wherein the hydrophilic unit is a vinylpyrrolidone unit.

10. The porous hollow fiber membrane according to claim 9, wherein the polymer including a monocarboxylic acid vinyl ester unit is a copolymer composed of a monocarboxylic acid vinyl ester unit and a vinylpyrrolidone unit.

11. The porous hollow fiber membrane according to claim 1, wherein an area percentage of a carbon peak derived from an ester group is 0.1 (atomic %) or more and
25 (atomic %) or less, when the measurement is performed on at least one surface of the outer surface or the inner surface of the porous hollow fiber membrane by X-ray photoelectron spectroscopy, on the assumption that the total peak area derived from carbon is 100 (atomic %).

12. The porous hollow fiber membrane according to claim 1, wherein the polymer including a monocarboxylic acid vinyl ester unit has a number-average molecular weight of 1,000 or more and 1,000,000 or less.

13. A porous hollow fiber membrane module comprising the porous hollow fiber membrane according to claim 1 housed in a housing.

14. A purification system for obtaining desired cells or proteins from a solution containing cells and proteins, comprising the porous hollow fiber membrane according to claim 1 and a separation membrane having pores each having a diameter smaller than that in the hollow fiber membrane, wherein the porous hollow fiber membrane and the separation membrane are arranged such that the solution is sequentially treated by the porous hollow fiber membrane and the separation membrane.

15. A method of separating virus from biological components including virus and proteins by filtrating the biological components with the porous hollow fiber membrane according to claim 1.

16. A method of separating antibody-producing cells from antibodies by filtrating mixture of the antibody-producing cells and the antibodies with the porous hollow fiber membrane according to claim 1.

17. A method of separating an antibodies-from antibody aggregates by filtrating mixture of the antibodies and the antibody aggregates with the porous hollow fiber membrane according to claim 1.

\* \* \* \* \*